A. ROGERS.
GASOLENE MEASURING AND TESTING DEVICE.
APPLICATION FILED MAR. 8, 1920.

1,378,280.

Patented May 17, 1921.

INVENTOR.
ALBERT ROGERS
BY A.B.Bowman
ATTORNEYS.

UNITED STATES PATENT OFFICE.

ALBERT ROGERS, OF SAN DIEGO, CALIFORNIA.

GASOLENE MEASURING AND TESTING DEVICE.

1,378,280.   Specification of Letters Patent.   Patented May 17, 1921.

Application filed March 8, 1920. Serial No. 363,989.

*To all whom it may concern:*

Be it known that I, ALBERT ROGERS, a citizen of the United States, residing at San Diego, in the county of San Diego and State of California, have invented a certain new and useful Gasolene Measuring and Testing Device, of which the following is a specification.

My invention relates to a gasolene measuring and testing device for measuring the quantity of gasolene in the gasolene tank of an automobile and for testing its quality and temperature and the objects of my invention are: first, to provide a device, by the use of which the quantity of gasolene in an automobile fuel supply tank may be readily determined; second, to provide a device of this class in which the quantity of gasolene may be readily determined when it is dark if it is necessary; third, to provide a device of this class in which the quality of the gasolene in the tank may be determined; fourth to provide a device of this class in which the temperature of the gasolene may be readily determined; fifth, to provide a device of this class which combines a measure and gasolene tester of both quality and temperature in the one device and sixth, to provide a device of this class which is very simple and economical of construction, durable, easy to operate, easy to read and test and which will not readily deteriorate or get out of order.

Figure 1:
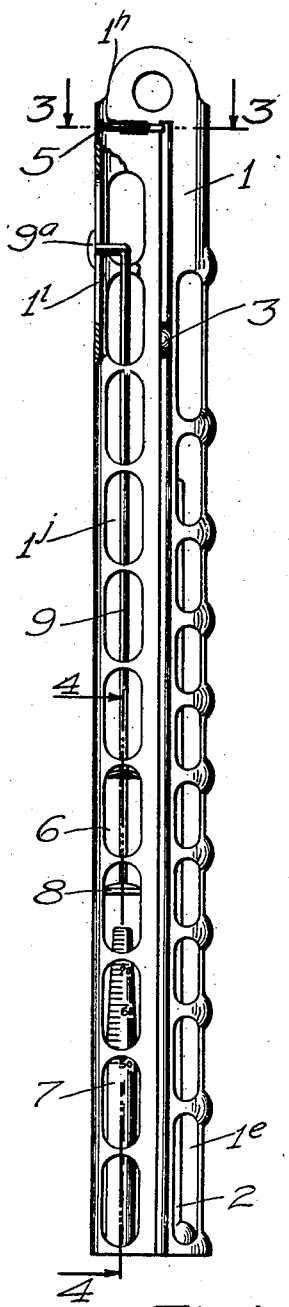
Figure 2:
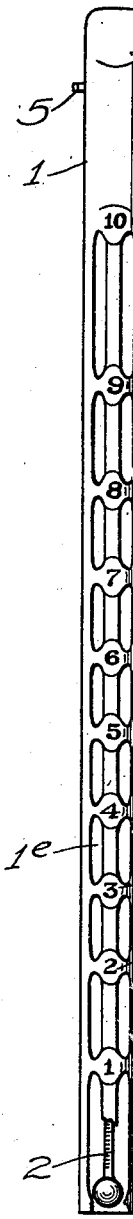
Figure 3:
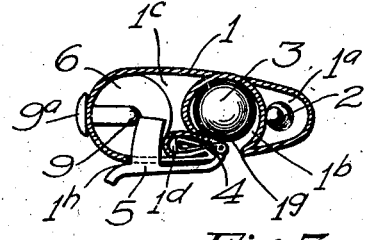
Figure 4:
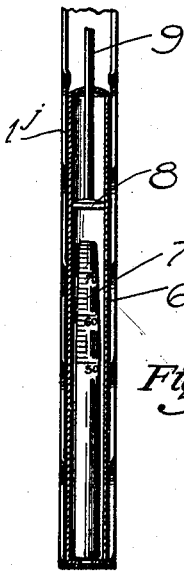

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a side elevational view of the device complete showing portions broken away and in section to facilitate the illustration; Fig. 2 is a similar view at a right angle thereto; Fig. 3 is a sectional view through 3—3 of Fig. 1 and Fig. 4 is a sectional view on the line 4—4 of Fig. 1.

Similar characters of reference refer to similar parts and portions throughout the several views of the drawings.

The casing 1, thermometer 2, spherical float 3, latch member 4, latch support 5, glass tube 6, hydrometer 7, plunger 8, and plunger rod 9 constitute the principal parts and portions of my gasolene measure and tester.

The casing 1 is metallic, preferably aluminum and it is shaped as shown best in cross section in Fig. 3 of the drawing forming four separate compartments $1^a$, $1^b$, $1^c$, and $1^d$. Mounted in the compartments $1^a$ in the lower end thereof is an ordinary thermometer, the index portion of which extends upwardly and the portion of the casing surrounding the same is provided with a series of perforations $1^e$ between which are gallon index characters $1^f$. Loosely mounted in the portion $1^b$ is a float 3 which is a hollow spherical member, preferably of aluminum, which is adapted to move endwise freely in the compartment $1^b$. Adjacent this compartment is another smaller compartment $1^d$ which is spaced therefrom by a partition $1^g$ and in this compartment $1^d$ at the upper end is provided a wedge shaped latch member 4, to which is pivotally connected a latch support 5. The latch member 4 is adapted to be moved sidewise engaging the partition $1^g$, pressing it against the float member 3, holding it in suspended position in the compartment $1^b$. This latch member 4 is supported in such manner by means of the latch support 5 inserted in a slot $1^h$ near the upper end of the member 1. Secured in the lower end of the compartment $1^c$ is a glass cylinder 6, provided with a hole in the lower end, adapted to admit the gasolene and mounted in this lower end is the hydrometer 7, which is of the conventional form of glass tube indexed float hydrometer. Reciprocably mounted in the upper end of this cylinder 6 is a plunger 8, which is provided with a plunger rod 9 which extends upwardly and near the top it extends out through a slot $1^i$ and it is provided with a button $9^a$ on its outer end. The casing 1 is provided on opposite sides of the compartment $1^c$ with a series of perforations $1^j$, which are adapted for measures for another form of tank than the perforations $1^e$.

The operation of the device is as follows:

It is inserted in a vertical position into the gasolene filling hole in the upper side of the tank and its lower end rests against the bottom of the tank whereupon the float 3 will float on the surface of the gasolene, the latch member 5 being disengaged so that the float is free, then the latch member 4 is moved, depressing the partition $1^g$ until it engages the float holding it in such position and the latch support 5 is placed in the position as shown in Fig. 3, then the device is removed and the position of the float 3 indicates the quantity of gasolene in the tank as indicated by the numerals $1^f$. When the device is removed from the tank the temperature of the gasolene may be read through the perforations $1^e$ on the thermometer 2. When it is desired to test the quality of the gasolene the end of the device is inserted into the gasolene in the tank, the button $9^a$ moved upwardly causing the gasolene to enter the cylinder 6 at the lower end whereupon the hydrometer is floated in the gasolene and may be readily read through the perforations $1^j$ after which the button $9^a$ is moved downwardly releasing the gasolene in the cylinder 6.

Though I have shown and described a particular construction, combination and arrangement of parts and portions, I do not wish to be limited to this particular construction, combination and arrangement but desire to include in the purview of my invention the construction, combination and arrangement substantially as set forth in the appended claims.

Having thus described my invention what I claim as new and desire to secure by Letters Patent, is:

1. A device of the class described, including a casing provided with an index and divided into thermometer and float compartments, the float compartments having a flexible side wall, and a latch member adapted to compress said side wall of the float compartment whereby said side wall engages the float for holding it in any position desired in said compartment.

2. A device of the class described, including a casing provided with an index and divided into thermometer and float compartments, a float in said float compartment, means for supporting said float in any position desired in said float compartment, a transparent cylinder mounted adjacent said float compartment in said casing provided with a reciprocating plunger therein and a hydrometer in said cylinder below said plunger.

3. A device of the class described, including a casing provided with a longitudinal float compartment, one of the walls of said float compartment being flexible, a float movable longitudinally in said float compartment and a manually operative latch for compressing the flexible wall of said float compartment whereby it engages the float for holding said float in any desired position in said float compartment.

4. A device of the class described, including a casing provided with a longitudinal float compartment, a float movable longitudinally therein, a latch for supporting said float in any position desired in said float compartment, a hydrometer compartment adjacent said float compartment and a hydrometer positioned therein.

In testimony whereof, I have hereunto set my hand at San Diego, California, this 1st day of March, 1920.

ALBERT ROGERS.